United States Patent
Fennel

(10) Patent No.: US 6,535,803 B1
(45) Date of Patent: Mar. 18, 2003

(54) SUPPLY OF DATA TO MOTOR VEHICLES

(75) Inventor: Helmut Fennel, Bad Soden (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/555,469

(22) PCT Filed: Nov. 20, 1998

(86) PCT No.: PCT/EP98/07486

§ 371 (c)(1),
(2), (4) Date: Aug. 24, 2000

(87) PCT Pub. No.: WO99/28160

PCT Pub. Date: Jun. 10, 1999

(30) Foreign Application Priority Data

Nov. 27, 1997 (DE) .......................................... 197 52 488
Nov. 17, 1998 (DE) .......................................... 198 53 000

(51) Int. Cl.$^7$ ................................................. G06F 7/04
(52) U.S. Cl. ............................. 701/33; 701/24; 701/29; 340/825.31; 340/425.5; 375/220
(58) Field of Search ............................. 701/1, 2, 24, 29, 701/30, 31, 33, 36; 340/825.31, 825.04, 825.83, 425.5, 438; 375/220

(56) References Cited

U.S. PATENT DOCUMENTS 5,479,157 A * 12/1995 Suman et al. .......... 340/825.31
5,717,387 A * 2/1998 Suman et al. .......... 340/825.31

FOREIGN PATENT DOCUMENTS

GB     2 263 376      7/1993
GB     2 273 580      6/1994

* cited by examiner

Primary Examiner—Thomas G. Black
Assistant Examiner—Arthur D. Donnelly
(74) Attorney, Agent, or Firm—Rader, Fishman & Grauer PLLC

(57) ABSTRACT

In a method and an arrangement for data transmission or for supplying automotive vehicles with data which are used for the operation of regulating and control systems, for the exchange of data and/or for polling, modifying and updating of data of this type, the data transmission is performed at fixed intervals by means of a wireless data transmission device comprising a transceiver (1), a relay station (100) and a central unit (200). Data which may contain one or more pieces of information about the technical analysis of the brake system and other systems, the thickness of brake linings, the oil level, the air pressure, etc., is transmitted via this channel.

3 Claims, 2 Drawing Sheets

SUPPLY OF DATA TO MOTOR VEHICLES

TECHNICAL FIELD

The present invention relates to a method of supplying automotive vehicles with data which can be evaluated for the operation, monitoring and/or maintenance of automotive vehicles.

BACKGROUND OF THE INVENTION

To increase the safety and driving comfort of automotive vehicles, electronic regulating and control systems, monitoring, warning and guiding systems, etc., are being installed into vehicles at an increasing rate. The function of such systems is mainly based on data processing, because the loading of data, data updating, data exchange, and monitoring of the single actions is very important.

Loading of the control programs is part of the manufacture of the vehicle. Monitoring such data, updating the programs, reading out data about wear, etc., is done during repair or maintenance operations in repair shops which, for this purpose, are equipped with corresponding diagnosis apparatus, data transmission devices and computers. The exchange of data and their evaluation is reserved to being carried out by experts in the repair shops.

An object of the present invention is to develop a method which permits communicating with the electronic system of the vehicle irrespective of servicing intervals and repair shop visits, such communication meaning acquiring, evaluating, exchanging and updating the various data and programs independently of any stays in a repair shop.

This additional and more frequent communication between the electronic system installed in a vehicle and external monitoring or servicing devices should take place unnoticed by the driver to the greatest extent possible. Thus, a recall action may be avoided, for example, in the event that a program change in an electronic component of the automotive vehicle becomes necessary.

It has been found that this object can be achieved by a method of the type mentioned hereinabove, the special features of which involve that data transmission is performed in regular and individually definable intervals by means of wireless communication devices which will become a part of the basic equipment of every vehicle in the very near future.

Irrespective of servicing intervals and without additional expenditure in time, data transmission is performed in regular intervals which can be evaluated in a different manner and for different use according to the present invention. This is done unnoticed by the driver and does not require additional time on his/her part. During uncritical operating conditions, a communication takes place between the electronic systems of the vehicle and the external monitoring devices by way of which the vehicle is connected by the wireless communication device, depending on how the present invention is implemented, via online to service stations, the vehicle manufacturer, etc.

Data transmission is principally effected in both directions. This way, e.g. sets of parameters or complete software programs can be loaded into the vehicle electronic system, provided the individual control devices are equipped with corresponding data memories, etc.

According to a favorable embodiment of the present invention, data is transmitted, polled or exchanged by a wireless transmission device, which data holds one or more of the following pieces of information:

technical diagnosis or analysis of the brake system, the chassis, the electrical system, of one or more vehicle control systems, of the driving engine, especially information about the air pressure of the individual wheels, the oil level in the driving engine, the brake lining thickness, etc.

The vehicle is monitored this way.

The method of the present invention also renders it possible to convey pieces of information about the wear of determined components, such as the brake linings, the type of the fuel that was last replenished, and other data, to the vehicle and, especially, the electronic control systems such as, e.g., an electronic stability control system or an engine management system in order to thereby automatically adapt the brakes or the engine control to the prevailing conditions.

In the event of detection of a deviation from the predetermined nominal tire pressure in the data transmission during the data exchange, this fact is signaled optically or acoustically to the driver. He/she is requested to correct the tire pressure.

The arrangement for implementing the method according to the present invention is configured as a part of a wireless communication device and equipped with an additional data transmission device which comprises an interface installed in the automotive vehicle through which data flow or data exchange takes place. A sender/receiver arrangement installed in the automotive vehicle and adapted to transmit data in both directions is suitable as a data transmission device. Transmission devices of this type are suitably based on an electromagnetic transmission method. Transmission can be effected by a transceiver, installed in the vehicle, which transmits the information to a mobile radio system of the terrestrial type or operating via satellite.

DETAILED DESCRIPTION OF THE PREFERRED EMBODIMENTS

Figure 1:
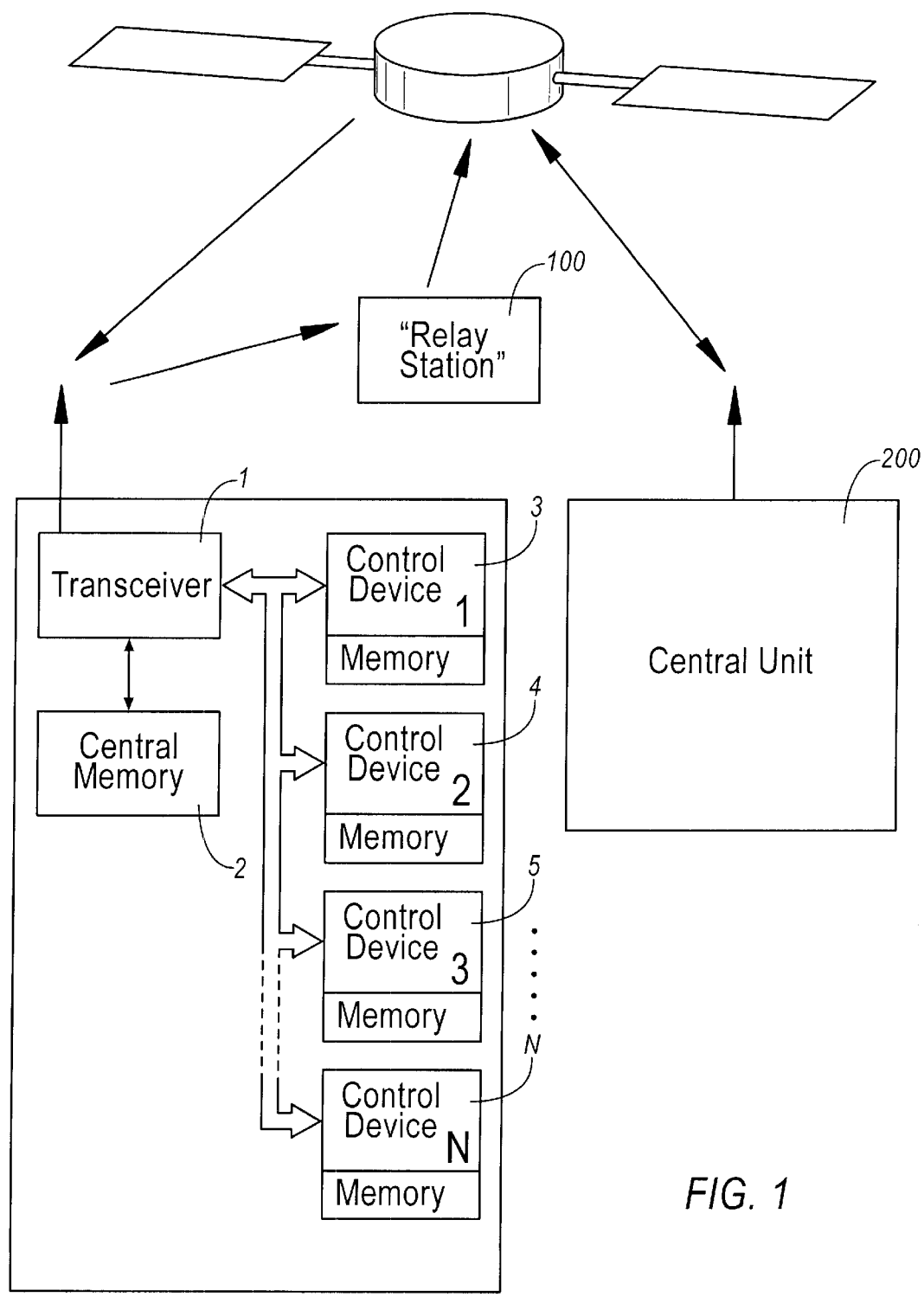
FIG. 1 is a schematically simplified view of the basic arrangement of the data transmission device.

The present invention is principally realized by extending a wireless communication device by means of additional elements for transmitting and evaluating determined vehicle-relevant data. This is illustrated in FIG. 1 in which an automotive vehicle with a device for transmitting data is symbolically shown.

The automotive vehicle comprises a transceiver (1) and communicates with a central unit (200) by way of a relay station (100) which may be a satellite, for example. The transceiver (1) is connected to a central memory (2) and may thus provide intermediate storage of the data to be transmitted or received. This is used to exactly protocol the transmitting and receiving operations. The transceiver (1) is connected to an optional number of different control devices (3, 4, 5, . . . N) and can communicate bidirectionally with them. The control devices (3, 4, 5, . . . N) are equipped with erasable and reprogrammable memories (3a, 4a, 5a, . . . Na) in which information about the conditions of respectively one part of the vehicle is stored. The stored information may be physical measured quantities or also complete program instructions for the respective components. During uncritical operating conditions, i.e., in the absence of need of making use of the data stock of the control devices and in the event that safety of operation and failfree mode of functioning is not jeopardized, the data in the control devices (3, 4, 5, . . . N) can be modified. This comprises reading-out of data and also reading-in of new data. Exactly as the transceiver (1), the control devices (3, 4, 5 . . . N) are coded electronically in order to ensure an accurate addressing during data exchange.

Figure 2:
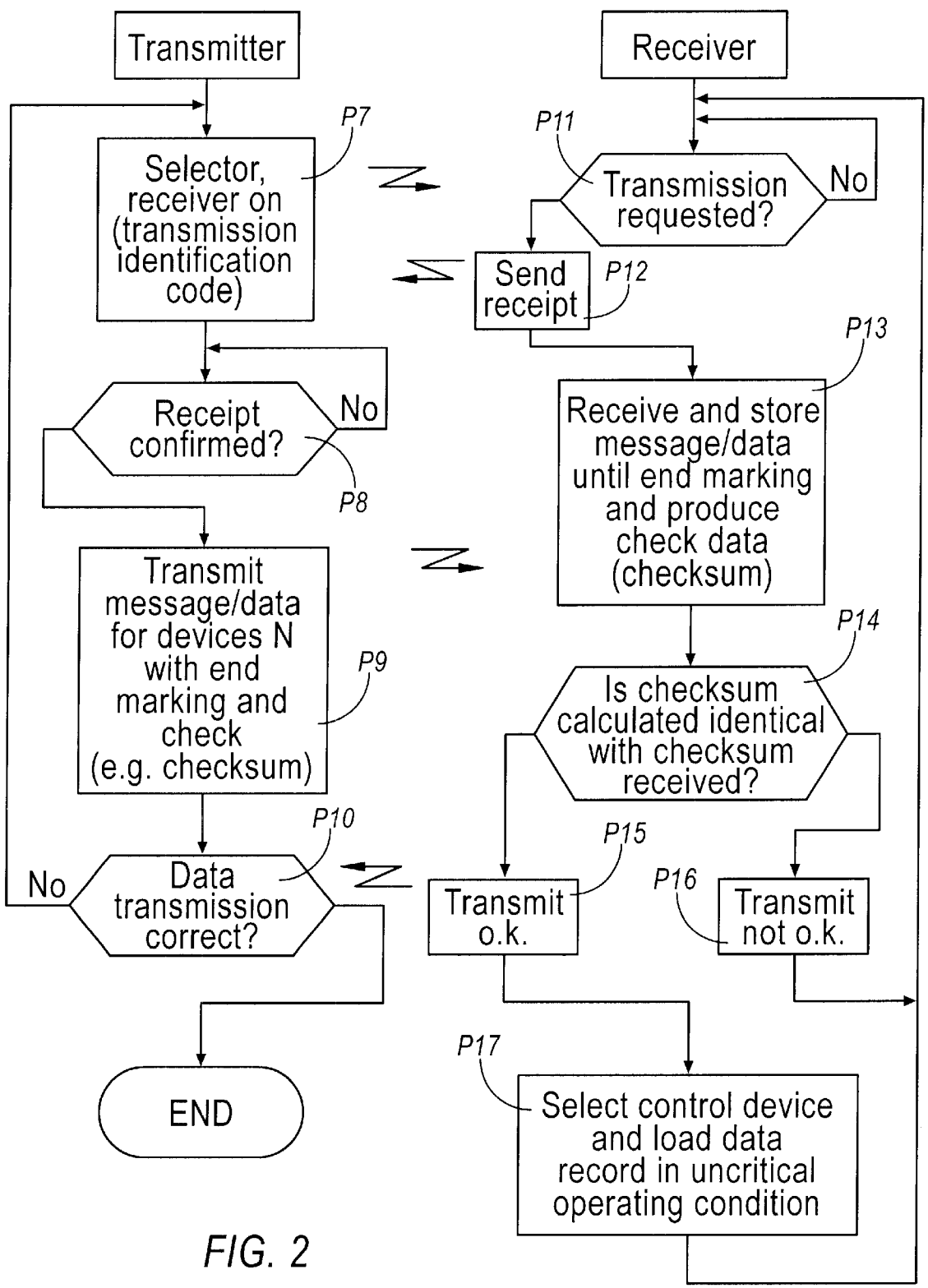
FIG. 2 is a flow chart illustrating an embodiment for implementing the method of the present invention.

The embodiment of FIG. 2 shows a possibility of transmitting data and simultaneously safeguarding data integrity. A method of this type renders it possible to release already preprogrammed functions or introduce improvements such as "on-line updates".

The elements illustrated on the left-hand side in FIG. 2 describe the flow chart of a central unit (200) which transmits data to the transceiver (1) that is shown on the right-hand side in FIG. 2. To this end, the central unit (200) selects a receiver from a list and demands transmission in program step (P7). The transceiver (1) waits in the ready position for the demand for transmission (P11) and will send a send receipt (P12) to the central unit (200) when transmission has been effected. When the send receipt (P12) has been received properly, the receipt is confirmed (P8) in the central unit, and the central unit (200) sends the message or the data provided with an additional identification code for the control device (3, 4, 5 . . . N) and an end marking (P9). These additional identification codes may be configured as a checksum. The transceiver (1) is now in listening watch and stores in the central memory (2) the data until the end marking is transmitted (P13). Subsequently, the identification code is calculated (P14) by the transceiver (1), and a report is sent to the central unit (200). In case an identification code has not been recognized failfree, a negative report is sent (P16) to the central unit (200), and renewed sending of the data is demanded. In the event of a correct identification, a communication is also sent to the central unit (200) and proper receipt confirmed (P16). Subsequently, the transceiver (1) selects the control device (3, 4, 5, . . . N) chosen for the transmitted data and sends to it the data during an uncritical operating condition.

Apart from the embodiment which is illustrated in detail herein, there is of course still the possibility of transmitting data from the transceiver (1) to the central unit (200). It is, for example, possible to calculate brake lining wear, oil replacement intervals, etc., by means of the sensors which are installed in the vehicle, or also by means of wear models.

It is self-explanatory that the illustrated procedure is only one of various linkings, possibilities of evaluation, or signal course plans. It is important that the appropriate measures for error detection, error signaling and, if possible, error elimination, are triggered as a result of the information transmitted and evaluated.

What is claimed is:

1. Method of supplying automotive vehicles with data that can be used for an operation, comprising the steps of:
   monitoring maintenance tracking systems and other automotive vehicle regulating or control systems,
   exchanging the monitored data between a transceiver in a vehicle and a central unit by means of wireless data transmission devices,
   exchanging complete programs, program parts or subprograms associated with said monitoring from the central unit to the automotive vehicle by way of the data transmission device and
   installing the complete programs, program parts, or subprograms associated with said monitoring in the automotive vehicle.

2. Method as claimed in claim 1, wherein data transmission is performed during uncritical operating conditions.

3. Method as claimed in claim 1, wherein conventional communication and/or navigation channels are employed for data transmission.

* * * * *